United States Patent
Shearer

(10) Patent No.: US 11,796,374 B2
(45) Date of Patent: Oct. 24, 2023

(54) COMPOSITE WATER TANK LEVEL SENSOR

(71) Applicant: GOODRICH CORPORATION, Charlotte, NC (US)

(72) Inventor: Jon Shearer, Hartville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 92 days.

(21) Appl. No.: 17/212,841

(22) Filed: Mar. 25, 2021

(65) Prior Publication Data

US 2021/0325231 A1 Oct. 21, 2021

Related U.S. Application Data

(60) Provisional application No. 63/011,890, filed on Apr. 17, 2020.

(51) Int. Cl.
| | |
|---|---|
| *G01F 23/263* | (2022.01) |
| *B64F 5/60* | (2017.01) |
| *B64D 41/00* | (2006.01) |

(52) U.S. Cl.
CPC .......... *G01F 23/263* (2013.01); *B64D 41/00* (2013.01); *B64F 5/60* (2017.01)

(58) Field of Classification Search
CPC .... G01F 23/265; G01F 23/266; G01F 23/268; G01F 23/26; G01F 23/263; G01F 23/242; G01F 23/241; G01F 1/56; G01F 25/0061; G01N 27/22
See application file for complete search history.

(56) References Cited

U.S. PATENT DOCUMENTS

| | | | | |
|---|---|---|---|---|
| 4,149,231 | A | * | 4/1979 | Bukosky .............. G01N 27/228 |
| | | | | 73/304 C |
| 4,583,402 | A | * | 4/1986 | Myers ................... G01F 23/266 |
| | | | | 73/304 C |
| 5,315,872 | A | | 5/1994 | Moser |
| 6,943,566 | B2 | | 9/2005 | Florin et al. |
| 7,997,132 | B2 | | 8/2011 | Ross, Jr. et al. |
| 10,161,779 | B2 | | 12/2018 | Lazzi et al. |
| 10,433,666 | B1 | | 10/2019 | Jovanov |

(Continued)

FOREIGN PATENT DOCUMENTS

| | | | |
|---|---|---|---|
| CN | 101039153 A | * | 9/2007 |
| EP | 2626675 | | 8/2013 |

(Continued)

OTHER PUBLICATIONS

European Patent Office, European Search Report dated Sep. 24, 2021 in Application No. 21168682.9.

*Primary Examiner* — Harshad R Patel
*Assistant Examiner* — Truong D Phan
(74) *Attorney, Agent, or Firm* — SNELL & WILMER L.L.P.

(57) ABSTRACT

A capacitive point source sensor for detecting presence of a liquid includes a main body having a sensor end and an outer end, the main body being configured to be coupled to and at least partially inserted through a container of the liquid. The sensor further includes two conductive contacts located on the sensor end of the main body. The sensor further includes an insulator enclosing the two conductive contacts.

14 Claims, 5 Drawing Sheets

(56) References Cited

U.S. PATENT DOCUMENTS

| | | | | |
|---|---|---|---|---|
| 2005/0156962 | A1* | 7/2005 | Sasaki | G01F 23/266 |
| | | | | 347/85 |
| 2008/0057303 | A1* | 3/2008 | Tsushima | C04B 35/83 |
| | | | | 428/339 |
| 2014/0305202 | A1* | 10/2014 | Periyathamby | G01F 23/268 |
| | | | | 73/304 C |
| 2015/0204709 | A1* | 7/2015 | Dudley | G01F 23/26 |
| | | | | 73/304 R |
| 2016/0202105 | A1 | 7/2016 | Baer et al. | |
| 2019/0242689 | A1* | 8/2019 | Elhajj | G01B 7/08 |
| 2019/0368450 | A1* | 12/2019 | Honda | B60K 15/03 |
| 2020/0189383 | A1* | 6/2020 | Jadir Mendes Ferreira | |
| | | | | B64D 37/02 |

FOREIGN PATENT DOCUMENTS

| | | | | |
|---|---|---|---|---|
| EP | 2840366 | | 2/2015 | |
| JP | H09142572 | | 6/1997 | |
| RU | 2039692 | C1 * | 7/1995 | |
| WO | WO-9220050 | A1 * | 11/1992 | G01F 23/265 |
| WO | 2018225010 | | 12/2018 | |

\* cited by examiner

COMPOSITE WATER TANK LEVEL SENSOR

CROSS-REFERENCE TO RELATED APPLICATIONS

This application claims priority to, and the benefit of, Provisional Patent Application No. 63/011,890, filed Apr. 17, 2020 and titled "COMPOSITE WATER TANK LEVEL SENSOR," which is incorporated by reference herein in its entirety for all purposes.

FIELD

The present disclosure relates to systems and methods for detecting liquid levels in a composite container.

BACKGROUND

Aircraft may include various containers for transporting or storing liquid. For example, aircraft may include one or more container for storing potable water used for cooking, drinking, and the like during flight. It is desirable to measure or detect an amount of the potable water remaining in each container. In that regard, sensors may be installed in such containers to detect the water levels. Such sensors may corrode themselves and/or the container, shortening a useful life of the sensors and/or containers.

SUMMARY

Disclosed herein is a system for detecting a fluid level in a container. The system includes the container having an inner surface and an outer surface and formed using a semiconductor material. The system further includes a conductive plate located on the outer surface of the container. The system further includes an insulator located between the conductive plate and the container.

Any of the foregoing embodiments may further include a lead coupled to the conductive plate; and a controller coupled to the lead and configured to transmit a first signal to the conductive plate via the lead and to receive a second signal from the conductive plate via the lead.

In any of the foregoing embodiments, the controller is further configured to determine a voltage of the second signal, and the voltage of the second signal corresponds to the fluid level.

In any of the foregoing embodiments, the controller is further configured to determine the fluid level based on the voltage of the second signal.

In any of the foregoing embodiments, the controller includes a switch having a first position to transmit the first signal to the conductive plate and a second position to receive the second signal from the conductive plate.

In any of the foregoing embodiments, the first signal and the second signal are direct current (DC) signals.

In any of the foregoing embodiments, the controller is further configured to receive a DC aircraft power signal and convert the DC aircraft power signal to the first signal.

Any of the foregoing embodiments may further include a second lead coupled to the container and to a ground in the controller.

In any of the foregoing embodiments, the insulator includes at least one of glass, fiberglass, or a polymer.

In any of the foregoing embodiments, the insulator includes a fiberglass window in the container and the conductive plate includes a metal embedded within the fiberglass window.

Also disclosed is a system for detecting a fluid level in a container. The system includes the container having an inner surface and an outer surface and formed using a carbon composite material. The system further includes a conductive plate located on the outer surface of the container. The system further includes an insulator located between the conductive plate and the container. The system further includes a controller coupled to the conductive plate and configured to transmit a first signal to the conductive plate and to receive a second signal from the conductive plate.

In any of the foregoing embodiments, the controller is further configured to determine a voltage of the second signal, and the voltage of the second signal corresponds to the fluid level.

In any of the foregoing embodiments, the controller is further configured to determine the fluid level based on the voltage of the second signal.

Also disclosed is a method for detecting a fluid level in a container. The method includes outputting a first signal to a conductive plate, the conductive plate being located on the container formed from a semiconductor material and electrically isolated from the container. The method also includes receiving a second signal having an amplitude from the conductive plate. The method also includes determining a fluid level of a fluid in the container based on the amplitude of the second signal.

In any of the foregoing embodiments, the first signal is output to the conductive plate via a first lead and the second signal is received from the conductive plate using the same first lead.

In any of the foregoing embodiments, the conductive plate is separated from the container via a fiberglass window, and the conductive plate includes a metal embedded within the fiberglass window.

In any of the foregoing embodiments, the container is electrically connected to an electrical ground.

Any of the foregoing embodiments may further include controlling a switch to be in a first position to cause the outputting the first signal, and then controlling the switch to be in a second position to cause the receiving the second signal.

Any of the foregoing embodiments may further include receiving a power signal and converting the power signal to the first signal.

In any of the foregoing embodiments, the first signal and the second signal are direct current (DC) signals.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
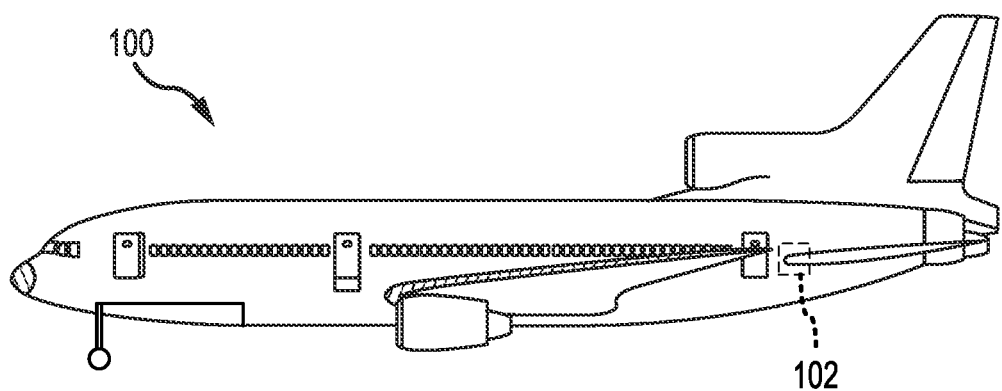
FIG. 1 illustrates an aircraft having a container for storing potable water, in accordance with various embodiments.
Figure 2:
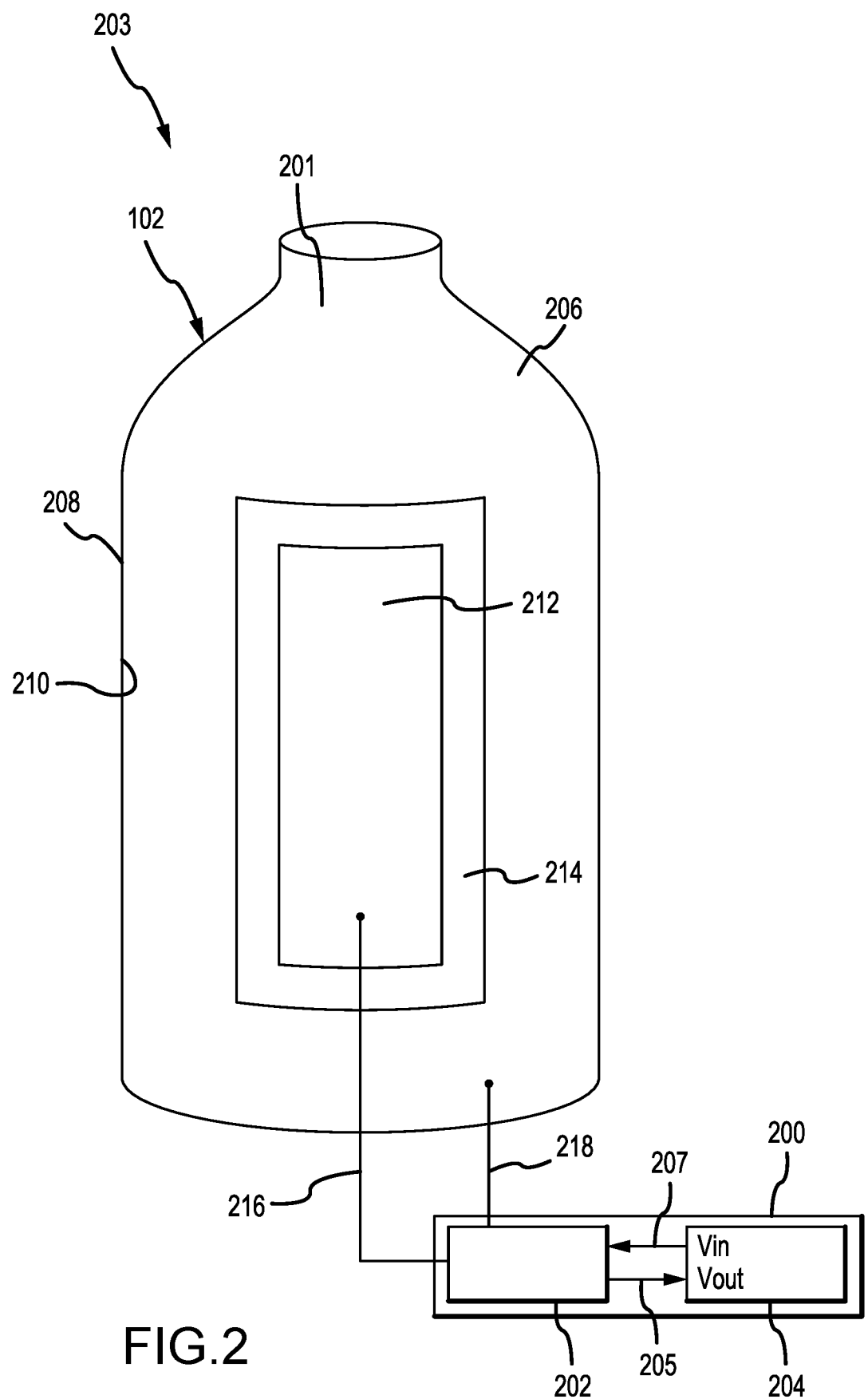
FIG. 2 illustrates a system for detecting water levels in the container of the aircraft of FIG. 1, in accordance with various embodiments.

Referring now to FIG. 1, an aircraft 100 may include one or more container 102 for retaining or storing a liquid, such as potable water. Referring now to FIG. 2, a system 203 for detecting a fluid level in the container 102 is shown. The system 203 includes the container 102, a controller 200, a conductive plate 212, and an insulator 214.

The container 102 may have a main body 206 formed from a carbon composite material, or any other materials being non-corrosive and having semiconductor properties. In that regard, the main body 206 may have conductive properties. The main body 206 may have an outer surface 208 exposed to an environment of the container 102 and an inner surface 210 which contacts the liquid, such as potable water. It is desirable for the inner surface 210 of the main body 206 to avoid corrosion. The system 203 facilitates detection of the fluid level while reducing or eliminating the likelihood of corrosion of the inner surface 210.

The conductive plate 212 may be separated from the main body 206 by the insulator 214. The insulator 214 may include any insulator such as fiberglass, glass, a polymer, or the like. The conductive plate 212 may include any conductive material including metals such as copper, tin, gold, silver, or the like. In various embodiments, the insulator 214 may include a window formed integral with the main body 206, and the conductive plate 212 may be embedded within the window. In various embodiments, the insulator 214 may be installed on the outer surface 208 of the main body 206, and the conductive plate 212 may be integrally or non-integrally installed on or embedded within the insulator 214.

The controller 200 may include one or more logic devices such as one or more of a central processing unit (CPU), an accelerated processing unit (APU), a digital signal processor (DSP), a field programmable gate array (FPGA), an application specific integrated circuit (ASIC), or the like. In various embodiments, the controller 200 may further include any non-transitory memory known in the art. The memory may store instructions usable by the logic device to perform operations.

The controller 200 may be coupled to the conductive plate 212 via a first lead 216 and to the main body 206 of the container 102 via a second lead 218. The controller 200 may include a sensing controller 202 and a determining controller 204. The sensing controller 202 may receive a direct current (DC) aircraft power signal from the determining controller 204 or from another source. The sensing controller 202 may output a first signal to the conductive plate 212 via the first lead 216, and may receive a second signal from the conductive plate 212 via the first lead 216. The first signal may include a DC power signal, and the second signal may include a DC power signal.

Because the conductive plate 212 is separated from the main body 206 via the insulator 214, the conductive plate 212 and the main body 206 may function as a capacitor. In that regard, the sensing controller 202 may receive, adjust, and output the second signal as an output signal 205. The output signal 205 may correspond to a fluid level of the fluid in the container 102 due to the capacitance between the conductive plate 212 and the main body 206. The amplitude of the second signal may correspond to the water level (i.e., a greater amplitude corresponds to a greater fluid level). In that regard, the determining controller 204 may determine the fluid level based on the output signal 205. In various embodiments, the determining controller 204 may be programmed with data that corresponds an amplitude of the second signal to the fluid level and, in various embodiments, the determining controller 204 may learn which amplitudes corresponds to each fluid level.

In various embodiments, it may be desirable for the fluid 201 in the container 102 to be ionized in order to facilitate the capacitance.

The system 203 provides various benefits and advantages. No corrosive materials are in contact with the fluid 201, increasing the useful life of the system 203. In that regard, the insulator 214 may be non-corrosive. Additionally, the system 203 may be used with a container having any shape, as the capacitance between the container 102 and the conductive plate 212 will provide a reliable estimate of the remaining fluid level regardless of the shape of the container.

Figure 3A:
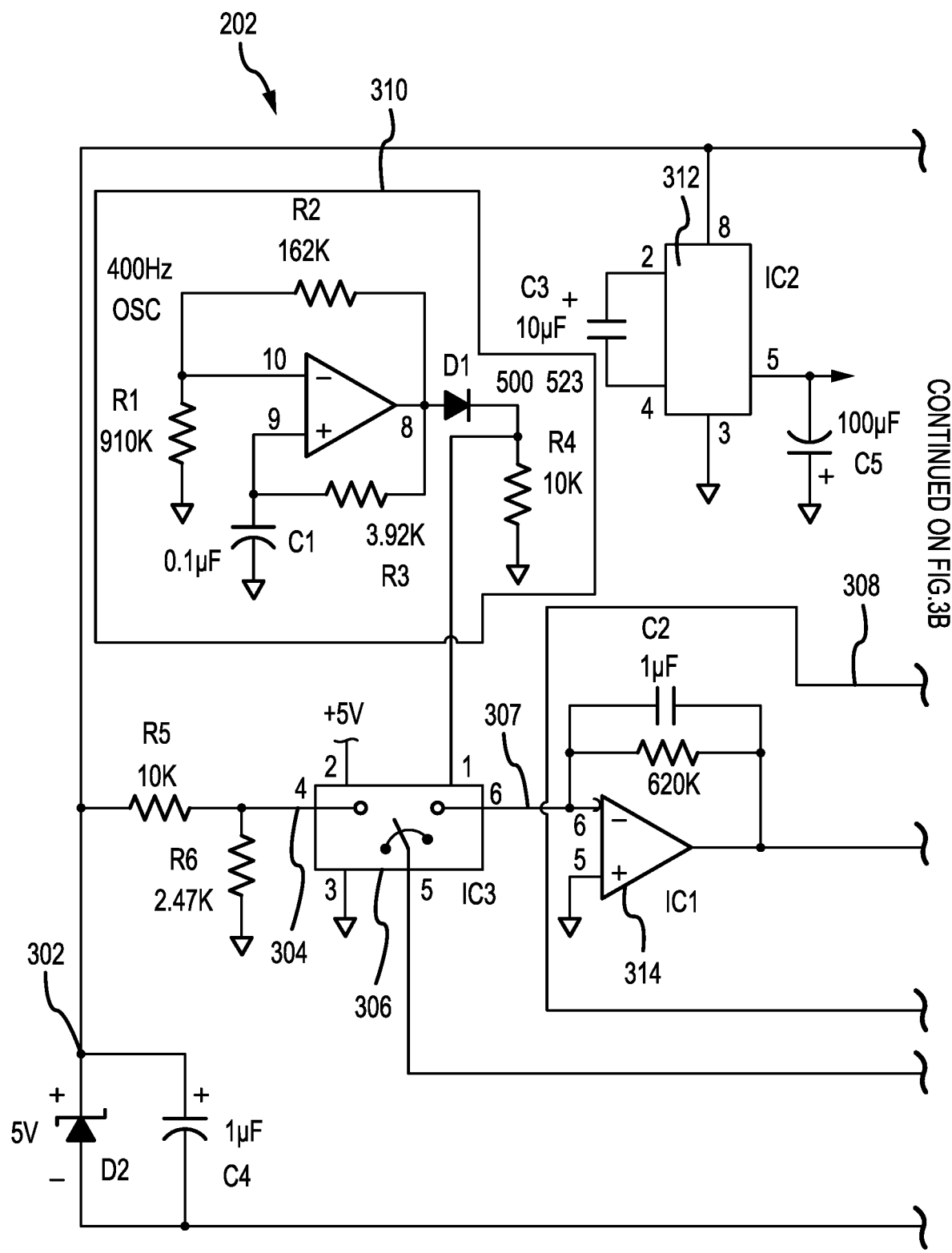
FIGS. 3A and 3B illustrate a sensing controller of the system of FIG. 2, in accordance with various embodiments.
Figure 3B:
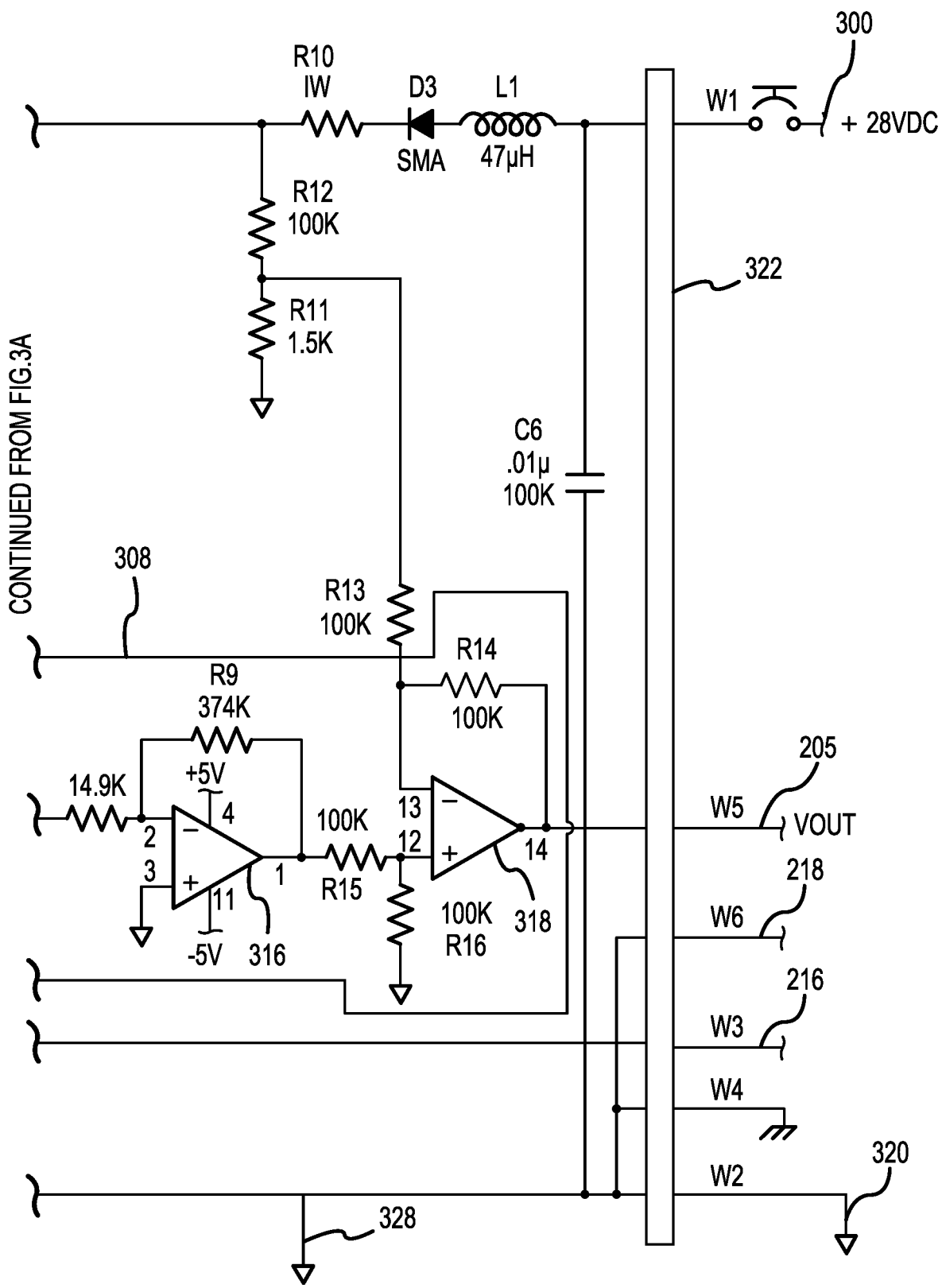

Referring now to FIGS. 3A and 3B, additional details of the sensing controller 202 are shown. The sensing controller 202 may receive direct current aircraft power 300, which in various embodiments may be 28 volts. An inductor L1 may reduce electromagnetic interference (EMI) from the DC aircraft power 300. Diodes D2 and D3, along with a capacitor C4 and a power converter 312 may reduce the voltage of the power signal at a location 302. For example, the voltage of the power signal at the location 302 may be between 1 and 20 volts, between 2 and 10 volts, or about 5 volts. Where used in this context, about refers to the referenced value plus or minus 10 percent. Two resistors R5, R6 may operate as a voltage divider to further reduce the voltage of the power signal at a location 304, such as to between 0.1 and 5 volts, between 0.5 volts and 2 volts, or about 1 volt.

An oscillator 310, which may include various electronic components, may create an oscillating signal. For example, the oscillating signal may be between 100 Hertz (Hz) and 1

Kilohertz (KHz), between 100 Hz and 700 Hz, or about 400 Hz. The oscillating signal may control operation of a switch 306.

The switch 306 may receive the oscillating signal along with the power signal from the location 304. The switch 306 may further be coupled to the first lead 216. In that regard, the switch 306 may switch between a first position (as shown) in which the power at the location 304 is transmitted to the first lead 216, and a second position in which the power from the first lead 216 is received by the switch at a location 307. The switching of the switch may be controlled by the oscillating signal. A capacitor C2 may hold the charge received at the location 307.

A collection of amplifiers 308 (including a first amplifier 314, a second amplifier 316, and a third amplifier 318) may receive the power signal from the location 307 and may adjust a gain and offset of the voltage received from the first lead 216. The output of the amplifiers 308 may be output as the output signal 205. The second lead 218 (coupled to the main body 206 of FIG. 2) may be connected to an electrical ground 328 of the sensing controller 202. A capacitor C6 may function as a filter for the input of the controller 202.

A connector 322 may be installed between the sensing controller 202 and the inputs and outputs 300, 205, 218, 216, 320 and may facilitate replacing the sensing circuit with relative ease.

Figure 4:
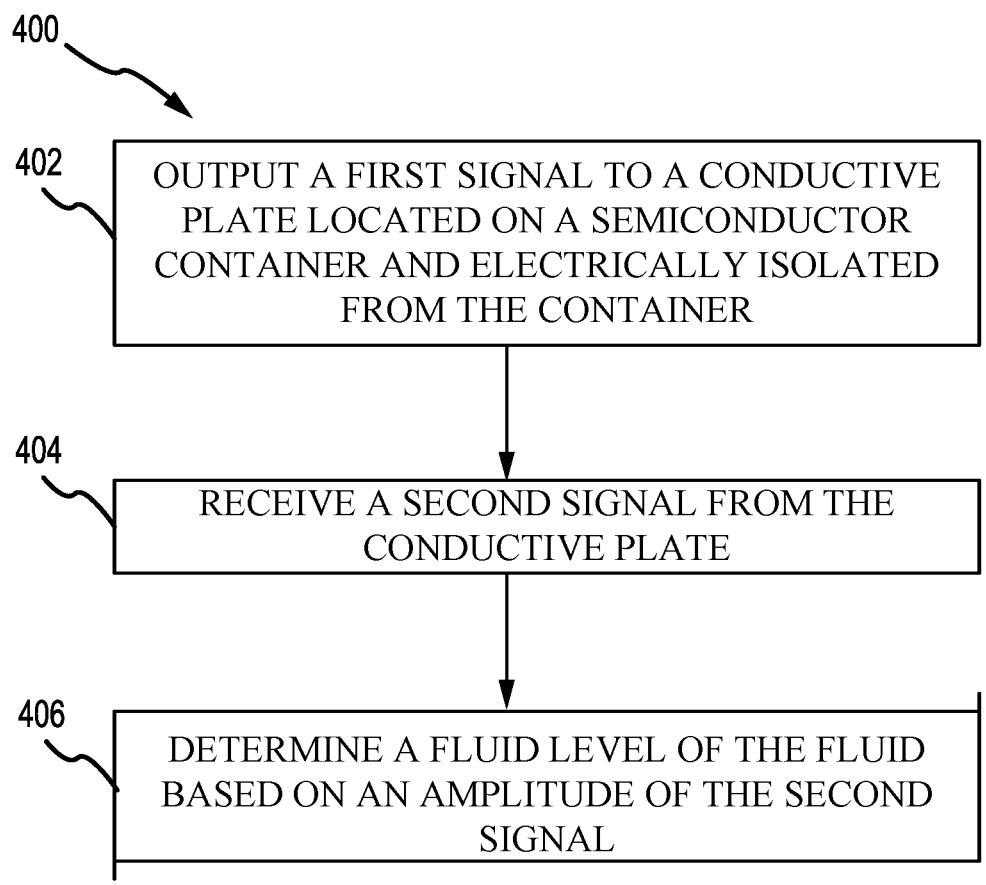
FIG. 4 is a flowchart illustrating a method for determining a fluid level of a container of an aircraft, in accordance with various embodiments.

Referring now to FIG. 4, a method 400 for detecting a fluid level of a fluid within a container is shown. The method 400 may be performed by similar components as the system 203 of FIG. 2. The method may begin in block 402 in which a controller may output a first signal, such as a DC power signal, to a conductive plate. The conductive plate may be similar to the conductive plate 212 of FIG. 2. In that regard, the conductive plate may be located on a container formed using a semiconductor material, and the conductive plate may be electrically isolated from the container.

In block 404, the controller or a different controller may receive a second signal from the conductive plate. For example, the second signal may likewise be a DC power signal. In that regard, the second signal may have an amplitude. Due to the capacitive properties between the conductive plate and the semiconductor container, the amplitude of the second signal may correspond to a fluid level of the fluid within the container. In that regard, a single conductive plate located on the container may be sufficient to determine the fluid level regardless of the fluid level and regardless of a shape of the container. This is beneficial as an aircraft manufacturer may design containers having various shapes in order to maximize space on the aircraft.

In block 406, the controller or a different controller may determine the fluid level of the fluid within the container based on the second signal. For example and because the amplitude of the second signal may correspond to the fluid level, the controller may determine the fluid level based on the amplitude of the second signal.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for detecting a fluid level in a container, the system comprising:
    the container formed using a semiconductor material comprising a carbon composite material, the carbon composite material having an inner surface and an outer surface and;
    an insulator located on the outer surface of the container;
    a conductive plate in contact with the insulator, the conductive plate entirely separated from the container by the insulator;
    a lead coupled to the conductive plate; and
    a controller comprising a sensing controller and a determining controller, the sensing controller coupled to the lead and configured to transmit a first signal to the conductive plate via the lead and to receive a second signal from the conductive plate via the lead, wherein the sensing controller includes a switch and an oscillator, the switch being coupled to the lead and being configured to receive an oscillating signal from the oscillator, the switch having a first position to transmit the first signal to the conductive plate and a second position to receive the second signal from the conductive plate, and wherein switching of the switch is controlled by the oscillating signal, wherein the container and the conductive plate form a capacitor, while being separated by the insulator.

2. The system of claim 1, wherein the determining controller is further configured to determine the fluid level based on the voltage of the second signal.

3. The system of claim 1, wherein the first signal and the second signal are direct current (DC) signals.

4. The system of claim 3, wherein the sensing controller is further configured to receive a DC aircraft power signal and convert the DC aircraft power signal to the first signal.

5. The system of claim 1, further comprising a second lead coupled to the container and to a ground in the controller.

6. The system of claim 1, wherein the insulator includes at least one of glass, fiberglass, or a polymer.

7. The system of claim 6, wherein the insulator includes a fiberglass window in the container and the conductive plate includes a metal embedded within the fiberglass window.

8. A system for detecting a fluid level in a container, the system comprising:
   the container having an inner surface and an outer surface comprising a carbon composite material, the carbon composite material having an inner surface and an outer surface and;
   an insulator located on the outer surface of the container;
   a conductive plate in contact with the insulator, the conductive plate entirely separated from the container by the insulator; and
   a controller comprising a sensing controller and a determining controller, the sensing controller coupled to the conductive plate and configured to transmit a first signal to the conductive plate and to receive a second signal from the conductive plate, wherein the sensing controller includes a switch and an oscillator, the switch being configured to receive an oscillating signal from the oscillator, the switch having a first position to transmit the first signal to the conductive plate and a second position to receive the second signal from the conductive plate, and wherein switching of the switch is controlled by the oscillating signal, wherein the container and the conductive plate form a capacitor, while being separated by the insulator.

9. The system of claim 8, wherein the determining controller is further configured to determine the fluid level based on the voltage of the second signal.

10. A method for detecting a fluid level in a container, the method comprising:
    outputting a first signal from a sensing controller to a conductive plate, the conductive plate being located on the container formed from a semiconductor material comprising a carbon composite material, the carbon composite material having an inner surface and an outer surface, an insulator located on the outer surface of the container, wherein the conductive plate is in contact with the insulator, the conductive plate entirely separated from the container by the insulator;
    receiving a second signal having an amplitude from the conductive plate to the sensing controller, wherein the first signal is output to the conductive plate via a first lead and the second signal is received from the conductive plate using the same first lead;
    determining a fluid level of a fluid in the container via a determining controller based on the amplitude of the second signal, the determining controller configured to learn a correlation between the amplitude of the second signal to the fluid level;
    controlling a switch to be in a first position to cause the outputting the first signal to the conductive plate; and controlling the switch to be in a second position to cause the receiving the second signal from the conductive plate, wherein controlling the switch is controlled by an oscillating signal received from an oscillator, wherein the container and the conductive plate form a capacitor, while being separated by the insulator.

11. The method of claim 10, wherein the conductive plate is separated from the container via a fiberglass window, and the conductive plate includes a metal embedded within the fiberglass window.

12. The method of claim 10, wherein the container is electrically connected to an electrical ground.

13. The method of claim 10, further comprising receiving a power signal and converting the power signal to the first signal.

14. The method of claim 10, wherein the first signal and the second signal are direct current (DC) signals.

* * * * *